United States Patent
Mukhlifi

(10) Patent No.: US 11,953,117 B2
(45) Date of Patent: Apr. 9, 2024

(54) GATE VALVE INDICATOR DEVICES FOR OIL AND GAS APPLICATIONS

(71) Applicant: Saudi Arabian Oil Company, Dhahran (SA)

(72) Inventor: Mohammed E. Mukhlifi, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 621 days.

(21) Appl. No.: 17/153,436

(22) Filed: Jan. 20, 2021

(65) Prior Publication Data
US 2022/0228674 A1 Jul. 21, 2022

(51) Int. Cl.
*F16K 37/00* (2006.01)
*F16K 3/30* (2006.01)
*E21B 34/02* (2006.01)

(52) U.S. Cl.
CPC ............ *F16K 37/0008* (2013.01); *F16K 3/30* (2013.01); *E21B 34/02* (2013.01)

(58) Field of Classification Search
CPC ...... F16K 37/0008; F16K 3/30; F16K 31/508; F16K 37/0016; F16K 3/02; E21B 34/02
See application file for complete search history.

(56) References Cited

U.S. PATENT DOCUMENTS

| | | | | |
|---|---|---|---|---|
| 308,975 A * | 12/1884 | Mixer | ................. | F16K 37/0008 251/117 |
| 450,451 A * | 4/1891 | Ferrell | ................ | F16K 37/0008 137/553 |
| 467,796 A * | 1/1892 | Ferrell | ................ | F16K 37/0008 137/553 |
| 580,252 A * | 4/1897 | Christie | ............. | F16K 37/0008 116/277 |
| 721,821 A * | 3/1903 | Myers | ................. | F16K 37/0008 137/556 |
| 899,733 A * | 9/1908 | Howard | ................... | G01D 9/28 346/36 |
| 1,235,767 A * | 8/1917 | Clark | ................. | F16K 37/0008 116/277 |

(Continued)

FOREIGN PATENT DOCUMENTS

CN 115325259 A * 11/2022
DE 20209749 U1 * 9/2002 ............... F16K 1/10

(Continued)

OTHER PUBLICATIONS

PCT International Search Report and Written Opinion in International Appln. No. PCT/US2022/013077, dated May 23, 2022, 17 pages.

*Primary Examiner* — Yaritza Guadalupe-McCall
(74) *Attorney, Agent, or Firm* — Fish & Richardson P.C.

(57) ABSTRACT

An indicator device is provided for indicating a configuration of a gate valve. The indicator device includes a cam that is coupled to a valve stem of the gate valve such that rotation of the valve stem causes rotation of the cam. The indicator device further includes a gear that is coupled to the cam such that rotation of the cam causes movement of the gear and a gauge along which the gear is movable. The gauge displays an indicator that corresponds to the configuration of the gate valve based on a first position of the gear and a second position of the valve stem.

19 Claims, 5 Drawing Sheets

(56) References Cited

U.S. PATENT DOCUMENTS

| | | | | |
|---|---|---|---|---|
| 1,534,866 | A | * | 4/1925 | Page .................. F16K 5/10 116/277 |
| 1,994,336 | A | * | 3/1935 | Dawson .............. F16K 41/00 137/553 |
| 2,350,763 | A | * | 6/1944 | Stonewall ............ D06B 23/00 91/35 |
| 2,767,681 | A | * | 10/1956 | Pontius ............. F16K 37/0016 137/553 |
| 2,768,604 | A | * | 10/1956 | Enerud ............. F16K 37/0008 137/553 |
| 2,930,344 | A | * | 3/1960 | Brasel .............. F16K 37/0008 137/551 |
| 3,011,359 | A | * | 12/1961 | Morrell .............. F16K 31/522 74/625 |
| 3,239,616 | A | * | 3/1966 | Rosenston ......... F16K 37/0008 200/61.86 |
| 4,213,480 | A | | 7/1980 | Orum et al. |
| 4,230,299 | A | | 10/1980 | Pierce, Jr. |
| 4,314,688 | A | | 2/1982 | Leman, Jr. |
| 4,411,288 | A | * | 10/1983 | Gain, Jr. ............ F16K 37/0008 137/553 |
| 4,541,490 | A | | 9/1985 | Bigbie et al. |
| 4,940,011 | A | * | 7/1990 | Wilkerson ......... F16K 37/0008 116/303 |
| 5,076,356 | A | | 12/1991 | Reimert |
| 5,411,239 | A | * | 5/1995 | Sorensen ............ F16K 31/163 251/255 |
| 5,507,469 | A | * | 4/1996 | Soderberg ........... F16K 5/0647 251/248 |
| 6,009,899 | A | * | 1/2000 | Polutnik ............ F16K 31/508 251/249.5 |
| 6,237,626 | B1 | * | 5/2001 | Wilkins ............ F16K 37/0008 251/248 |
| 6,571,877 | B1 | | 6/2003 | Van Bilderbeek et al. |
| 7,836,973 | B2 | | 11/2010 | Belcher et al. |
| 9,347,583 | B2 | * | 5/2016 | Emanuel ........... F16K 37/0016 |
| 9,574,404 | B2 | | 2/2017 | Tunget |
| 9,732,596 | B2 | | 8/2017 | Ollier et al. |
| 9,835,009 | B2 | | 12/2017 | Hess et al. |
| 10,487,587 | B2 | | 11/2019 | Cummins |
| 11,255,462 | B2 | * | 2/2022 | Bushman ........... F16K 37/0008 |
| 11,549,610 | B2 | * | 1/2023 | Bushman ........... F16K 37/0033 |
| 2007/0044957 | A1 | | 3/2007 | Watson et al. |
| 2008/0017386 | A1 | | 1/2008 | Van Bilderbeek et al. |
| 2009/0322359 | A1 | * | 12/2009 | Rho .................. F16K 37/0041 324/714 |
| 2010/0308246 | A1 | * | 12/2010 | Witkowski ......... F16K 37/0016 116/277 |
| 2011/0011599 | A1 | | 1/2011 | Nguyen et al. |
| 2011/0068287 | A1 | | 3/2011 | Grimseth et al. |
| 2011/0140027 | A1 | | 6/2011 | Parks |
| 2013/0240052 | A1 | * | 9/2013 | Bengtzen ............. F16K 3/0254 251/266 |
| 2014/0041861 | A1 | * | 2/2014 | Nicholson ........... E21B 34/02 166/97.1 |
| 2015/0376970 | A1 | | 12/2015 | Hughes et al. |
| 2018/0066767 | A1 | | 3/2018 | Nesloney |
| 2018/0372240 | A1 | | 12/2018 | Sanderson |
| 2019/0383405 | A1 | | 12/2019 | Harrel et al. |
| 2022/0057015 | A1 | * | 2/2022 | Smith ............... F16K 37/0008 |
| 2022/0228674 | A1 | * | 7/2022 | Mukhlifi ............. F16K 3/30 |
| 2022/0412208 | A1 | * | 12/2022 | Duncan ............... F16K 3/02 |

FOREIGN PATENT DOCUMENTS

| | | | | |
|---|---|---|---|---|
| EP | 2905521 | A1 * | 8/2015 | .......... F16K 31/122 |
| GB | 2242726 | A * | 10/1991 | ............ F16K 1/523 |
| KR | 19980020261 | A * | 10/1996 | |
| KR | 19980020261 | U * | 10/1996 | |
| KR | 19980020261 | | 7/1998 | |
| KR | 2011106668 | A * | 9/2011 | ............ F16K 31/05 |
| WO | WO 2010090797 | | 8/2010 | |
| WO | WO-2010090797 | A1 * | 8/2010 | .......... F16K 3/0254 |
| WO | WO 2020118253 | | 6/2020 | |
| WO | WO-2020118253 | A1 * | 6/2020 | ......... F16K 37/0008 |

\* cited by examiner

GATE VALVE INDICATOR DEVICES FOR OIL AND GAS APPLICATIONS

TECHNICAL FIELD

This disclosure relates to indicator devices for indicating a configuration of a gate valve, such as indicator devices for indicating whether a gate valve with a mechanical slab, non-rising stem design is open or closed.

BACKGROUND

During operation of a gate valve with a mechanical slab, non-rising stem design, several field issues can arise when the state of the gate valve (for example, the extent to which the gate valve is open) is unknown to a field operator. For example, such gate valves may be installed at wellhead equipment and provide no visible indication of the state of the gate valve. In some cases, the unknown state of the gate valve may require an intervention (for example, a manipulation of the gate valve) that compromises the safety of the field operator, the functionality of the gate valve, or the efficiency of a process carried out at the wellhead equipment.

SUMMARY

This disclosure relates to an indicator device for indicating a configuration of a gate valve (for example, the extent to which the gate valve is open). The gate valve includes a non-rising valve stem and a mechanical slab, and the indicator device is operable to indicate the configuration of the gate valve based on a rotational degree of the valve stem and a corresponding position of the slab. In this manner, the indicator device can indicate whether the gate valve has a closed configuration in which the slab is located at a reference position within a body of the gate valve or has an open configuration in which the slab is offset from the reference position within the body of the gate valve. The indicator device includes a gear mechanism that couples the valve stem of the gate valve to a gauge that displays an indicator of the gate valve configuration to a field operator in a safe and straight-forward manner. The gauge may be an analog gauge or a digital gauge. In some embodiments, the indicator device further includes a transmitter that can wirelessly transmit a signal corresponding to a rotational position of the valve stem and a corresponding configuration of the gate valve.

In one aspect, an indicator device is provided for indicating a configuration of a gate valve. The indicator device includes a cam that is coupled to a valve stem of the gate valve such that rotation of the valve stem causes rotation of the cam. The indicator device further includes a gear that is coupled to the cam such that rotation of the cam causes movement of the gear and a gauge along which the gear is movable. The gauge displays an indicator that corresponds to the configuration of the gate valve based on a first position of the gear and a second position of the valve stem.

Embodiments may provide one or more of the following features.

In some embodiments, the configuration of the gate valve is an open configuration or a closed configuration.

In some embodiments, the configuration of the gate valve is based on a third position of a slab of the gate valve that is coupled to the valve stem.

In some embodiments, the valve stem is a non-rising valve stem.

In some embodiments, the gear is configured to be rotated by the cam.

In some embodiments, the gear includes multiple gear teeth and the cam includes an indexer.

In some embodiments, the gear is configured to translate along the gauge.

In some embodiments, the gauge is coupled to multiple teeth that are arranged adjacent to the gear.

In some embodiments, the gauge is an analog gauge.

In some embodiments, the gauge includes a scale along which the indicator is movable.

In some embodiments, a first end of the scale corresponds to a fully open configuration of the gate valve and a second end of the scale corresponds to a closed configuration of the gate valve.

In some embodiments, the indicator includes a line.

In some embodiments, the indicator device further includes a transmitter that is configured to wirelessly transmit a signal corresponding to the configuration of the gate valve.

In some embodiments, the gauge is a digital gauge.

In another aspect, a system includes a gate valve and an indicator device for indicating a configuration of the gate valve. In some embodiments, the indicator device includes a cam that is coupled to a valve stem of the gate valve such that rotation of the valve stem causes rotation of the cam. The indicator device further includes a gear that is coupled to the cam such that rotation of the cam causes movement of the gear and a gauge along which the gear is movable. The gauge displays an indicator that corresponds to the configuration of the gate valve based on a first position of the gear and a second position of the valve stem.

Embodiments may provide one or more of the following features.

In some embodiments, the configuration of the gate valve is an open configuration or a closed configuration.

In some embodiments, the valve stem is a non-rising valve stem.

In some embodiments, the gauge is an analog gauge.

In some embodiments, the gauge is a digital gauge.

In another aspect, a method of indicating a configuration of a gate valve includes securing a cam of an indicator device to a valve stem of the gate valve, rotating the valve stem of the gate valve and the cam of the indicator device, moving a gear of the indicator device along a gauge of the indicator device in response to rotation of the cam, detecting a position of the gear along the gauge, and displaying an indicator on the gauge that corresponds to the configuration of the gate valve based on a first position of the gear and a second position of the valve stem.

The details of one or more embodiments are set forth in the accompanying drawings and description. Other features, aspects, and advantages of the embodiments will become apparent from the description, drawings, and claims.

DETAILED DESCRIPTION

Figure 1:
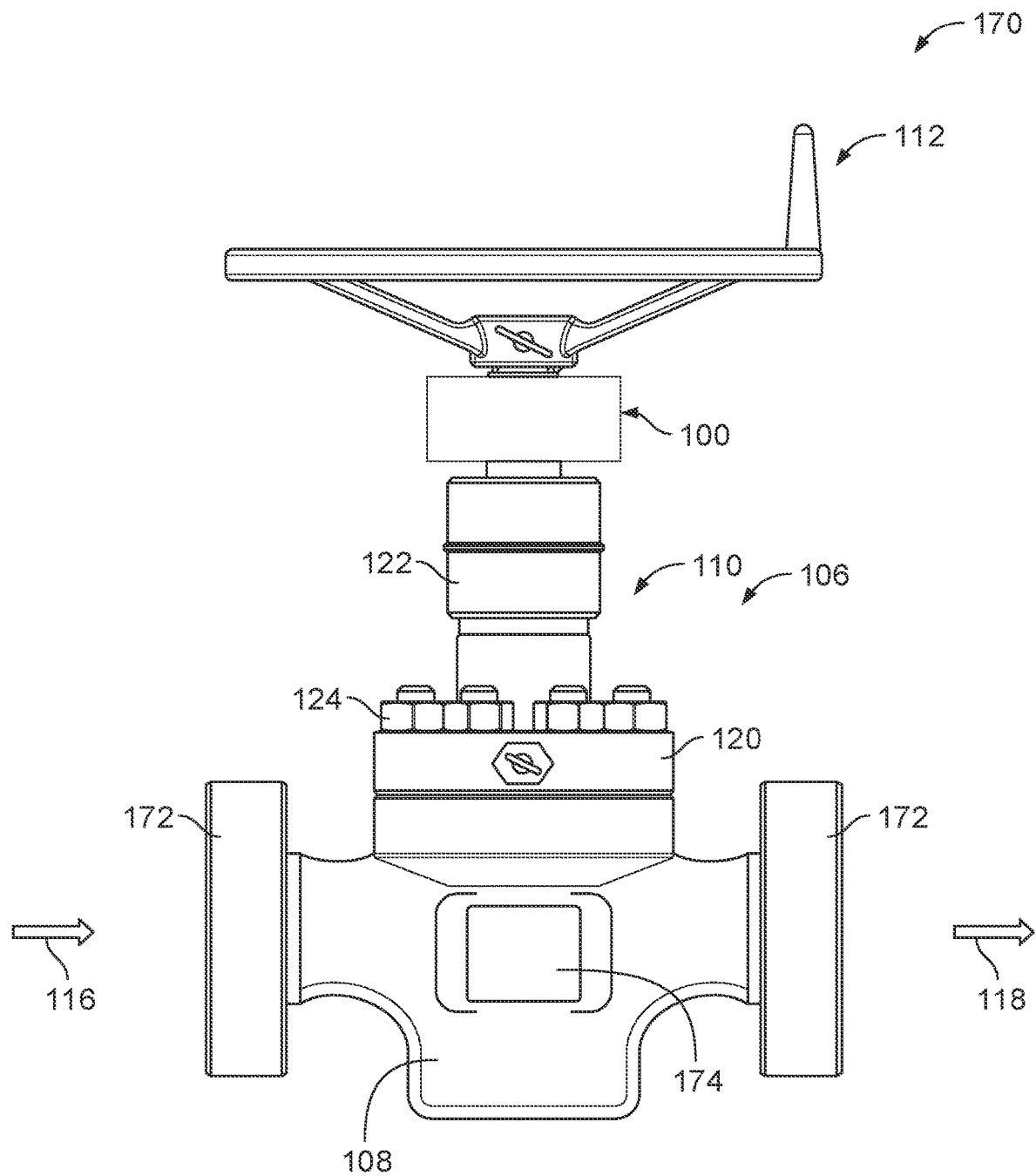
FIG. 1 is a front view of a system including an indicator device installed to a gate valve with a mechanical slab, non-rising stem design.

FIGS. 1-4 illustrate an example indicator device 100 that is designed to indicate a configuration of a gate valve 106 (for example, the extent to which the gate valve 106 is open). The gate valve 106 may be embodied as a mechanical slab gate valve with a non-rising stem design and may be produced by any manufacturer of such valves. When the indicator device 100 is installed to the gate valve 106, the indicator device 100 and the gate valve 106 together form a system 170. The gate valve 106 may be installed to wellhead equipment located at any well for controlling the flow of production fluids or injected fluids from the well or from an injection plant. The gate valve 106 includes a non-rising valve stem 102 and a mechanical slab 104, and the indicator device 100 is operable to indicate the configuration of the gate valve 106 based on a rotational degree of the valve stem 102 and a corresponding position of the slab 104. In addition to the valve stem 102 and the slab 104, the gate valve 106 includes a lower body 108, an upper body 110, and a wheel 112 (for example, a hand wheel).

The lower body 108 defines an internal fluid channel 114 through which fluid can flow when the gate valve 106 has an open configuration. The lower body 104 is equipped with flanges 172 for connecting the gate valve 106 to an inflow line and an outflow line (for example, represented by arrows 116, 118). The lower body 108 is also equipped with a label 174 (for example, a marking tag) on which manufacturing information (for example, date of manufacture, size, and trim features) may be printed or hand-marked. The upper body 110 includes a bonnet 120 and a cap 122 and is secured to the lower body 108 at fasteners 124. The upper body 110 surrounds the valve stem 102 and the slab 104 and supports the indicator device 100.

Figure 2:
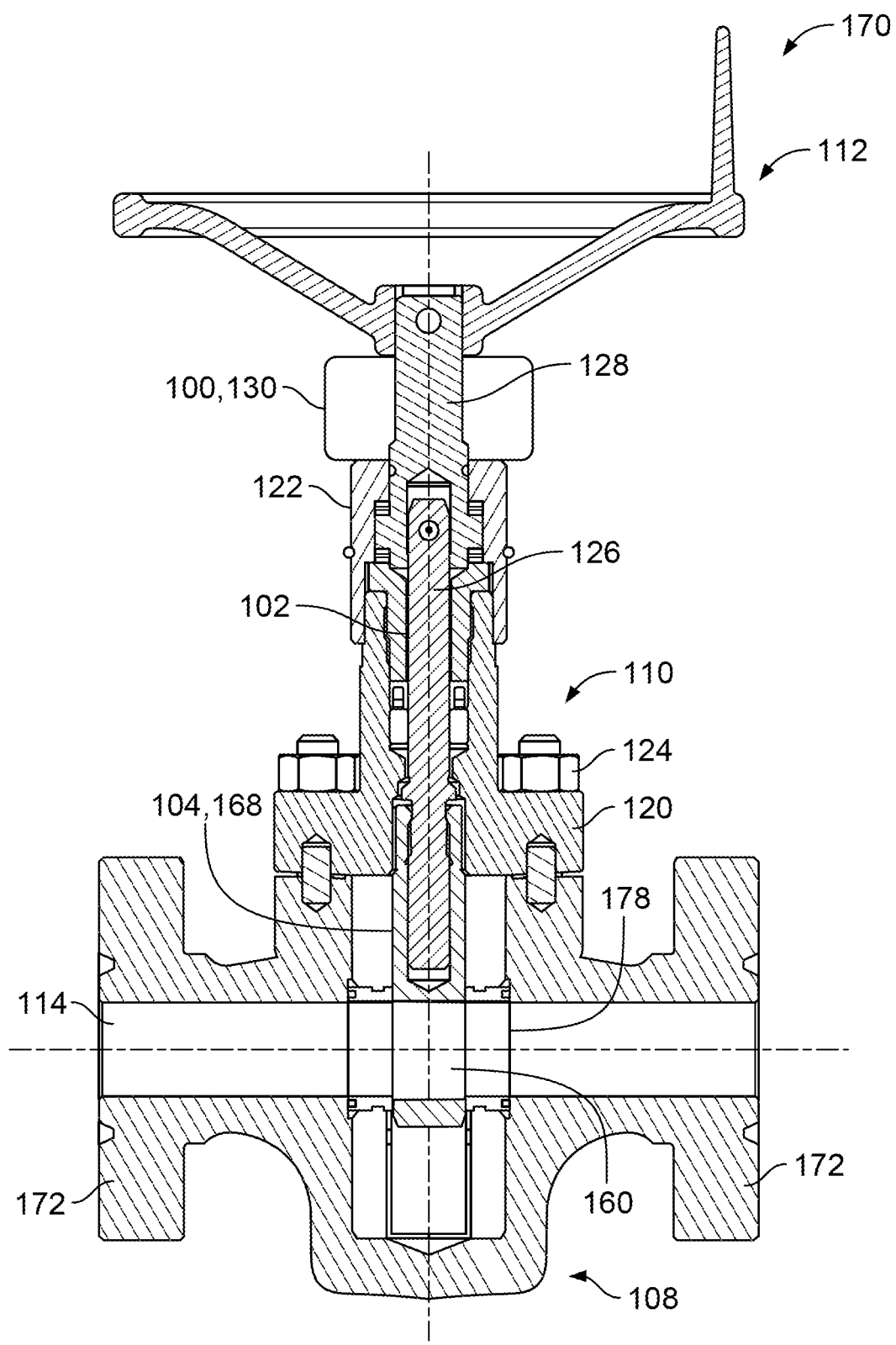
FIG. 2 is a cross-sectional, cutaway view of the indicator device and the gate valve of FIG. 1, with the gate valve in a fully open configuration.
Figure 3:
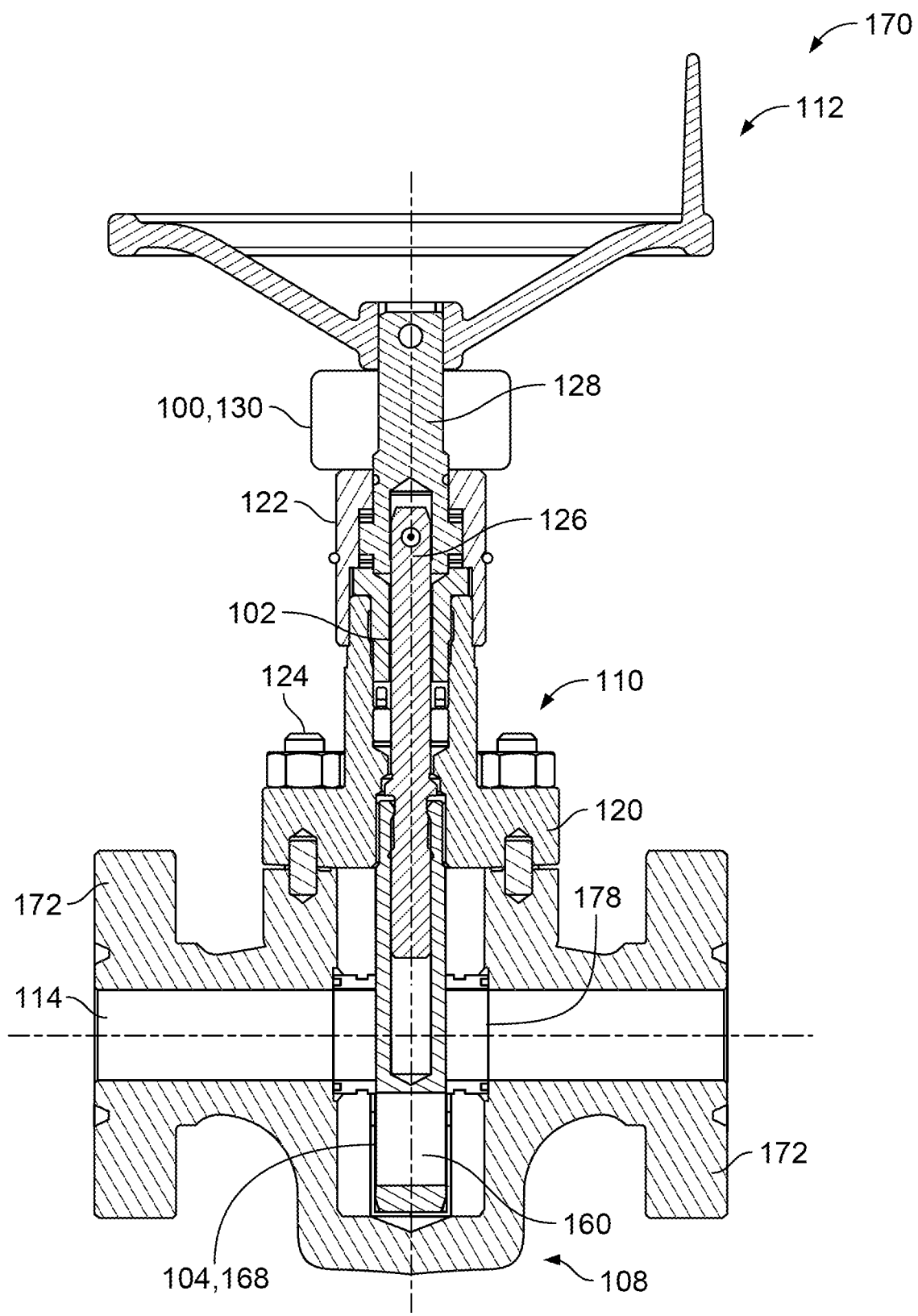
FIG. 3 is a cross-sectional, cutaway view of the indicator device and the gate valve of FIG. 1, with the gate valve in a closed configuration.

Referring particularly to FIGS. 2 and 3, the valve stem 102 is rotatable and is connected to the slab 104 at threads such that rotation of the valve stem 102 about an axis 126 causes vertical movement of the slab 104. For example, the slab 104 may be moved to completely, vertically align an opening 160 of the slab 104 with a seat 178 along the fluid channel 114 to fully open the fluid channel 114 to fluid flow or moved to completely, vertically offset the opening 160 of the slab 104 from the seat 178 along the fluid channel 114 such that a wall 168 of the slab 104 fully closes off (for example, blocks) the fluid channel 114 to fluid flow. The slab 104 may also be moved to an intermediate position in which the fluid channel 114 is partially open to fluid flow. The wheel 112 is supported above the indicator device 100. Accordingly, the gate valve 106 further includes a coupling member 128 that is connected to the valve stem 102 such that rotation of the wheel 112 causes rotation of the valve stem 102.

Figure 4:
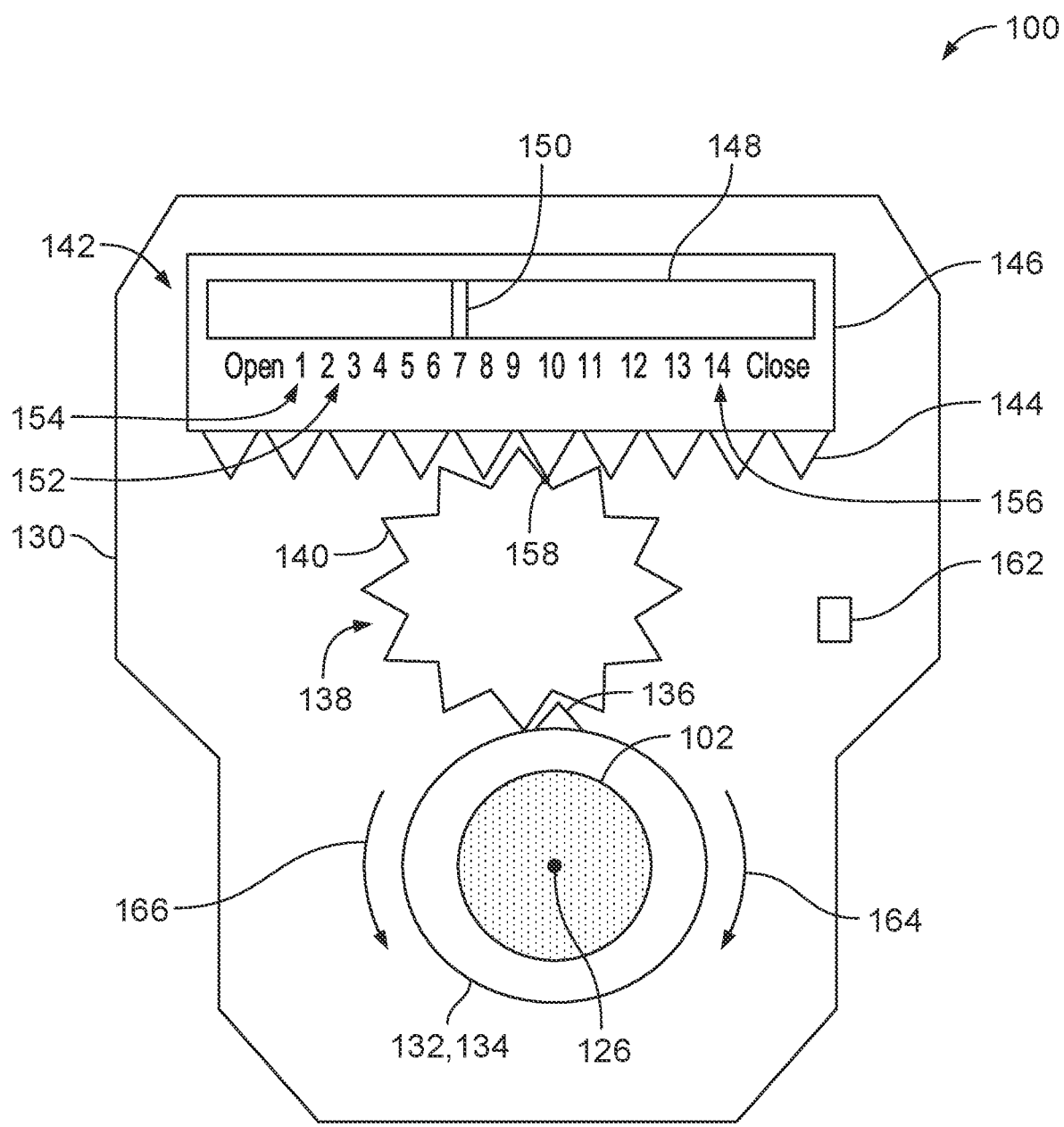
FIG. 4 is a front cutaway view of the indicator device of FIG. 1.

Referring particularly to FIG. 4, the indicator device 100 includes a housing 130 that surrounds a portion of the valve stem 102 (for example, or an adaptor that is coupled to the valve stem 102) and that is supported on the upper body 110 of the gate valve 106. The indicator device 100 further includes a cam 132 that is connected to the valve stem 102. The cam 132 includes a ring 134 that is fixedly attached to the valve stem 102 such that the cam 132 rotates with the valve stem 102. The cam 132 also includes an indexer 136 (for example, a tooth) that extends from the ring 134. The indicator device 100 also includes a rotatable gear 138 that is coupled to the indexer 136 of the cam 132 at gear teeth 140.

The indicator device 100 further includes a gauge 142 (for example, an analog gauge) that is coupled to the gear 138 at a row of indicator teeth 144. In addition to the indicator teeth 144, the gauge 142 includes a body 146 that supports the indicator teeth 144, a display 148 that shows a movable indicator 150 (for example, a visible line), and a scale 152 that indicates a rotational position of the valve stem 102. In some examples, the rotational position may be provided as a number of rotations of the valve stem 102 (for example, with respect to a reference rotational position) in a first direction 164 (for example, clockwise) or a second, opposite direction 166 (for example, counterclockwise) about the axis 126. The rotational position ranges from a fully open configuration of the gate valve 106 (for example, corresponding to complete alignment of the opening 160 of the slab 104 with the fluid channel 114) to a closed configuration of the gate valve 106 (for example, corresponding to a complete offset of the opening 160 of the slab 104 with respect to the fluid channel 114). In some embodiments, placing the gate valve 106 in the fully open configuration may require several complete turns (for example, 360 degree turns) of the valve stem 102 in one of the directions 164, 166. Similarly, adjusting the gate valve 106 from the fully open configuration to the closed configuration may require the same number of complete turns of the valve stem 102 in the other, opposite direction 164, 166. As the gear 138 is rotated due to movement of the valve stem 102, the gear 138 translates along the row of indicator teeth 144. A point of contact 158 between one of the gear teeth 140 and one of the indicator teeth 144 determines a position of the indicator 150. In some embodiments, the point of contact 158 may be detected by gear threads.

Presentation of the indicator 150 at the display 148 can provide an indication (for example, a visual indication) of the gate valve configuration to a field operator in a safe and straight-forward manner. In some embodiments, the indicator device 100 is additionally or alternatively equipped with a transmitter 162 that can wirelessly transmit data containing the rotational position of the valve stem 102 and, accordingly, the configuration of the gate valve 106, to a receiver (for example, located at a control room).

In some embodiments, an indicator device that is otherwise substantially similar in construction and function to the indicator device 100 can additionally or alternatively include a digital gauge (for example, including a digital display and a visible, digital indicator) instead of the analog gauge 142 (for example, including the analog display 148 and the movable indicator 150). In some embodiments, the digital gauge may not include the scale 152 and the indicator 150 and instead display a number on the display 148 that corresponds to a rotational position of the valve stem 102 (for example, a number that corresponds to a number along the scale 152 of the analog gauge 142). In some embodiments, the digital gauge may alternatively or additionally display a textual description of the configuration of the gate valve 106 that reads "Fully open," "Partially open," or "Closed." Such textual descriptions may correspond to a rotational position of the valve stem 102 that falls within predetermined position ranges. In other embodiments, the textual description may alternatively or additionally display a number of rotations of the valve stem, depending on the gate valve design.

The indicator device 100 can be easily installed to the gate valve 106. For example, the wheel 112 can be operated to fully open or to close the gate valve 106 until a positive stop is achieved. The indicator 150 may then be reset to a position that corresponds respectively to the fully open or closed configuration of the gate valve 106, and the wheel 112 may be removed from the upper body 110. The indicator device 100 may then be installed to the upper body 110 by sliding the housing 130 over the valve stem 102 (for example, or an adapter coupled to the valve stem 102). The wheel 112 may then be reinstalled to the upper body 110, and the gate valve 106 and the indicator device 100 can be operated.

Figure 5:
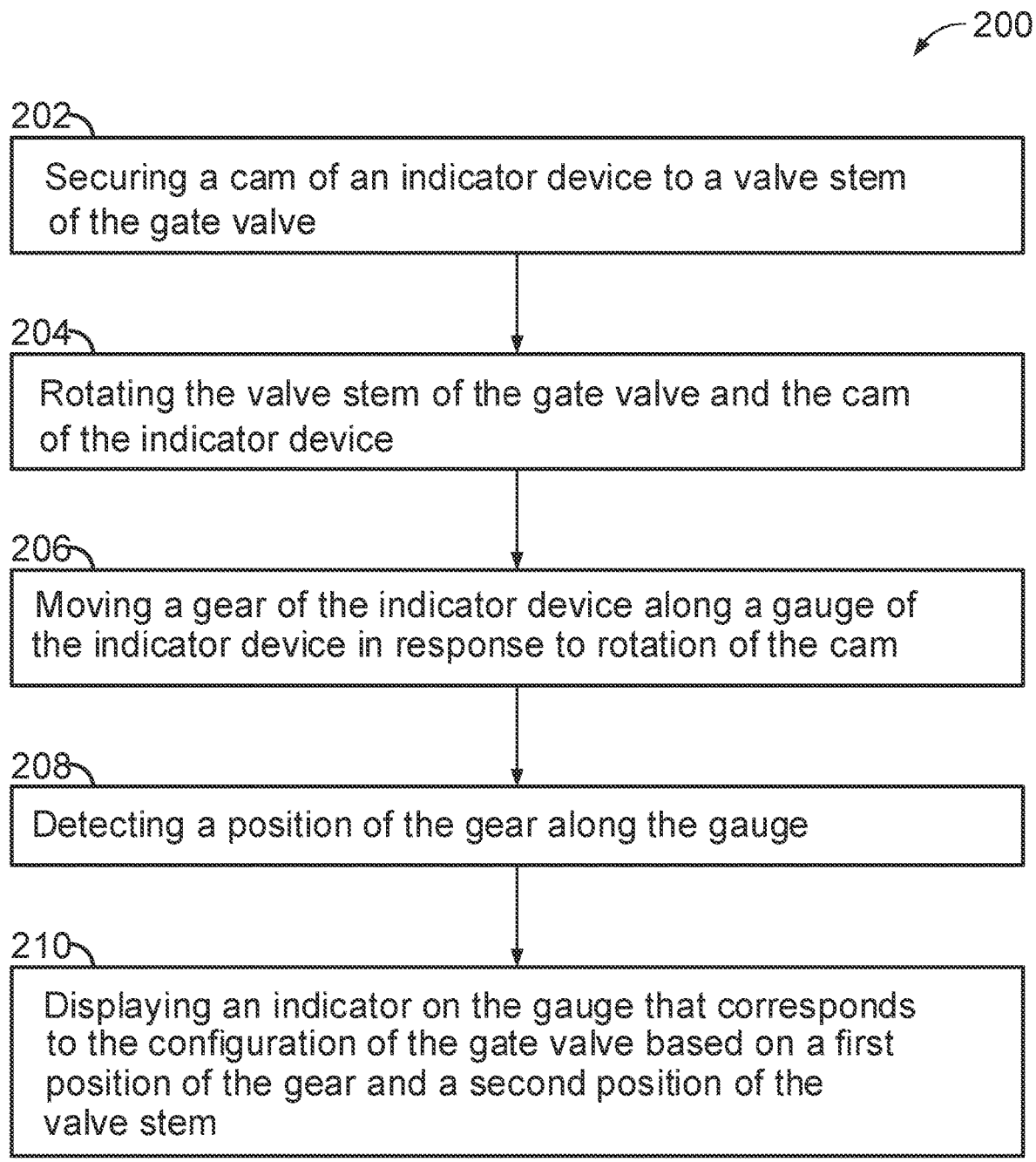
FIG. 5 is a flow chart illustrating an example method of indicating a configuration of a gate valve with the indicator device of FIG. 1.

FIG. 5 is a flow chart illustrating an example method 200 of indicating a configuration of a gate valve (for example, the gate valve 106). In some embodiments, the method 200 includes a step 202 for securing a cam (for example, the cam 132 of an indicator device (for example, the indictor device 100) to a valve stem (for example, the valve stem 102) of the gate valve. In some embodiments, the method 200 further includes a step 204 for rotating the valve stem of the gate valve and the cam of the indicator device. In some embodiments, the method 200 further includes a step 206 for moving a gear (for example, the gear 138) of the indicator device along a gauge (for example, the gauge 142) of the indicator device in response to rotation of the cam. In some embodiments, the method 200 further includes a step 208 for detecting a position of the gear along the gauge. In some embodiments, the method 200 further includes a step 210 for displaying an indicator (for example, the indicator 150) on the gauge that corresponds to the configuration of the gate valve based on a first position of the gear and a second position of the valve stem.

While the indicator device 100 has been described and illustrated with respect to certain dimensions, sizes, shapes, arrangements, and methods 200, in some embodiments, an indicator device that is otherwise substantially similar in construction and function to the indicator device 100 may include one or more different dimensions, sizes, shapes, arrangements, and configurations, or may be utilized according to different methods. Accordingly, other embodiments are also within the scope of the following claims.

What is claimed is:

1. An indicator device for indicating a configuration of a gate valve, the indicator device comprising:
   a cam that is coupled to a valve stem of the gate valve such that rotation of the valve stem causes rotation of the cam;
   a gear that is coupled to the cam such that rotation of the cam causes movement of the gear; and
   an elongate linear gauge along which the gear is rotatable and translatable, the elongate linear gauge having a fixed position and displaying a movable indicator having an indicator position that corresponds to the configuration of the gate valve based on a first position of the gear and a second position of the valve stem.

2. The indicator device of claim 1, wherein the configuration of the gate valve comprises an open configuration or a closed configuration.

3. The indicator device of claim 1, wherein the configuration of the gate valve is based on a third position of a slab of the gate valve that is coupled to the valve stem.

4. The indicator device of claim 1, wherein the valve stem comprises a non-rising valve stem.

5. The indicator device of claim 1, wherein the gear is configured to be rotated by the cam.

6. The indicator device of claim 5, wherein the gear comprises a plurality of gear teeth and the cam comprises an indexer.

7. The indicator device of claim 6, wherein the elongate linear gauge is coupled to a plurality of indicator teeth that are arranged in a row adjacent to the gear.

8. The indicator device of claim 1, wherein the elongate linear gauge comprises an analog gauge.

9. The indicator device of claim 8, wherein the elongate linear gauge comprises a scale along which the movable indicator is movable.

10. The indicator device of claim 9, wherein a first end of the scale corresponds to a fully open configuration of the gate valve and a second end of the scale corresponds to a closed configuration of the gate valve.

11. The indicator device of claim 9, wherein the movable indicator comprises a line.

12. The indicator device of claim 1, further comprising a transmitter that is configured to wirelessly transmit a signal corresponding to the configuration of the gate valve.

13. The indicator of claim 1, wherein the elongate linear gauge comprises a digital gauge.

14. A system comprising:
   a gate valve comprising a valve stem; and
   an indicator device for indicating a configuration of the gate valve, the indicator device comprising:
      a cam that is coupled to the valve stem of the gate valve such that rotation of the valve stem causes rotation of the cam,
      a gear that is coupled to the cam such that rotation of the cam causes movement of the gear, and
      an elongate linear gauge along which the gear is rotatable and translatable, the elongate linear gauge having a fixed position and displaying a movable indicator having an indicator position that corresponds to the configuration of the gate valve based on a first position of the gear and a second position of the valve stem.

15. The system of claim 14, wherein the configuration of the gate valve comprises an open configuration or a closed configuration.

16. The system of claim 14, wherein the valve stem comprises a non-rising valve stem.

17. The system of claim 14, wherein the elongate linear gauge comprises an analog gauge.

18. The system of claim 14, wherein the elongate linear gauge comprises a digital gauge.

19. A method of indicating a configuration of a gate valve, the method comprising:
   securing a cam of an indicator device to a valve stem of the gate valve;
   rotating the valve stem of the gate valve and the cam of the indicator device;
   rotating and translating a gear of the indicator device along an elongate linear gauge of the indicator device in response to rotation of the cam, the elongate linear gauge having a fixed position;
   detecting a position of the gear along the elongate linear gauge; and
   displaying a movable indicator on the elongate linear gauge, the movable indicator having an indicator position that corresponds to the configuration of the gate valve based on a first position of the gear and a second position of the valve stem.

* * * * *